(12) United States Patent
Meijer et al.

(10) Patent No.: US 6,655,723 B2
(45) Date of Patent: Dec. 2, 2003

(54) HYDRAULIC SLIDE OUT ASSEMBLY AND METHOD OF OPERATION

(75) Inventors: Bert Meijer, Overdinkel (NL); Haiko Freriksen, Hengelo(ov) (NL); Leo de Jong, Oldenzaal (NL)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/301,120

(22) Filed: Nov. 21, 2002

(65) Prior Publication Data

US 2003/0107229 A1 Jun. 12, 2003

Related U.S. Application Data

(60) Provisional application No. 60/332,161, filed on Nov. 21, 2001.

(51) Int. Cl.$^7$ .............................................. B62D 33/08
(52) U.S. Cl. ................................................. 296/26.01
(58) Field of Search ...................... 296/26.01, 26.13, 296/26.09, 165, 175; 52/67

(56) References Cited

U.S. PATENT DOCUMENTS

| 5,154,469 A | 10/1992 | Morrow |
|---|---|---|
| 5,577,351 A | 11/1996 | Dewald, Jr. et al. |
| 5,758,918 A | 6/1998 | Schneider et al. |
| 5,785,373 A | 7/1998 | Futrell et al. |
| 5,788,306 A * | 8/1998 | DiBiagio et al. ........ 296/26.13 |
| 5,857,733 A | 1/1999 | Dewald, Jr. et al. |
| 6,202,362 B1 | 3/2001 | McManus et al. |
| 6,227,607 B1 * | 5/2001 | Dewald, Jr. et al. ........ 296/165 |
| 6,572,170 B2 | 6/2003 | McManus et al. |

\* cited by examiner

*Primary Examiner*—Dennis H. Pedder
(74) *Attorney, Agent, or Firm*—Quarles & Brady LLP

(57) ABSTRACT

A vehicle including a stationary floor and an upwardly extending exterior wall fixed relative to the stationary floor. An opening formed in the exterior wall receives a slide-out section disposed therein, The slide-out section is movable relative to the stationary floor between an extended position and a retracted position. An actuating mechanism controls the movement of the slide-out section. The actuating mechanism includes at least one hydraulic actuator having an extendible ram extendible from a cylinder. The extendible ram is fixed to at least one of the stationary floor and the slide-out section, and the cylinder is fixed to the other of the stationary floor and the slide-out section. Retraction of the extendible ram slidably moves the slide-out section to the extended position.

12 Claims, 8 Drawing Sheets

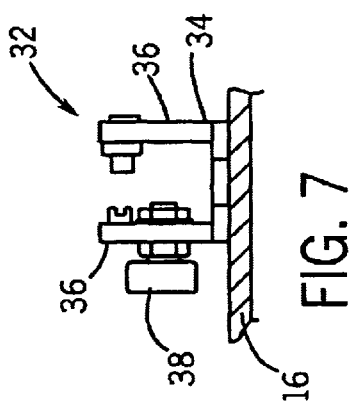
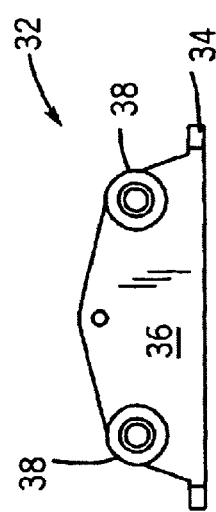
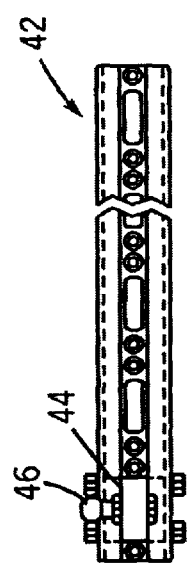
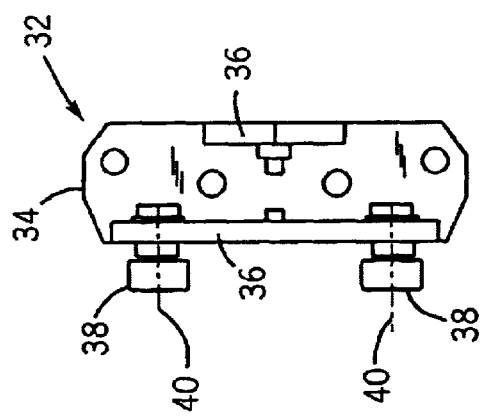
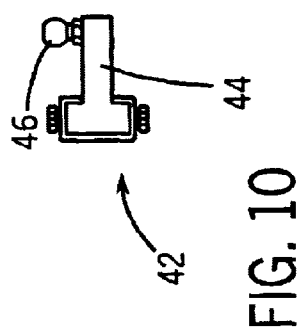
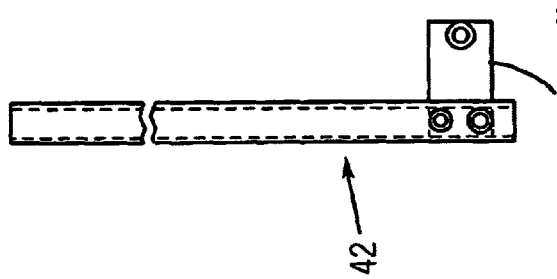

HYDRAULIC SLIDE OUT ASSEMBLY AND METHOD OF OPERATION

CROSS REFERENCES TO RELATED APPLICATIONS

This application claims the priority benefit of U.S. Provisional Patent Application No. 60/332,161 filed on Nov. 21, 2001.

STATEMENT REGARDING FEDERALLY SPONSORED RESEARCH

Not Applicable

BACKGROUND OF THE INVENTION

This invention relates to vehicles having expandable room sections, and more particularly to a slide-out assembly and method of operation for use in vehicles, wherein the slide-out assembly includes a hydraulic actuator for moving a slide-out section between an extended and retracted position.

In order to increase the available interior space of recreational vehicles or trailers, it is known to provide a raised platform slide-out section as part of the structure of the vehicle or trailer. The slide-out section includes a raised platform, usable as seating, a sleeping platform, and the like, which is enclosed on all but one side. During transit, the slide-out section is retracted and stored in the interior of the vehicle or trailer, with the exterior wall of the slide-out section approximately flush with the exterior of the vehicle or trailer. To use the slide-out section, the vehicle is first parked and leveled. The slide-out room section is then slid outward from the vehicle to an extended position, increasing the interior space of the vehicle.

In prior art constructions, the mechanism for moving the slide-out section relative to the stationary room section is fixed to the vehicle body, and pushes the slide-out away from the vehicle when extending the slide-out room, and pulls the slide-out section towards the vehicle when retracting the room. This particular configuration increases the space required to house the operating mechanism, and can result in portions of the operating mechanism being exposed when the slide-out section is fully extended.

SUMMARY OF THE INVENTION

The present invention provides a vehicle including a stationary floor and an upwardly extending exterior wall fixed relative to the stationary floor. An opening formed in the exterior wall receives a slide-out section disposed therein. The slide-out section is movable relative to the stationary floor between an extended position and a retracted position. An actuating mechanism controls the movement of the slide-out section.

The actuating mechanism includes at least one hydraulic actuator having an extendible ram extendible from a cylinder. The extendible ram is fixed to at least one of the stationary floor and the slide-out section, and the cylinder is fixed to the other of the stationary floor and the slide-out section. Retraction of the extendible ram slidably moves the slide-out section to the extended position.

In one embodiment of the present invention, a platform is spaced above the stationary floor and forms a part of the slide-out section. The operating mechanism is housed beneath the platform.

In another embodiment of the present invention, the actuating mechanism is controlled by an electronic control unit which also controls at least one latch, wherein when the slide-out section is in at least one of the extended position and retracted position, the electronic control unit energizes the latch to lock the slide-out section in the at least one of the extended position and said retracted position. The latch can be fixed to the slide-out section, and engage a hole formed in the vehicle, wherein the hole is fixed relative to the stationary floor. In addition, the latch can be fixed to a top plate of the slide-out section proximal a top edge of the opening.

In another embodiment of the invention, the actuating mechanism include at least two hydraulic actuators and a hydraulic circuit supplying hydraulic fluid to the at least two hydraulic actuators. The hydraulic circuit can include a flow divider which divides the flow of hydraulic fluid between the at least two hydraulic actuators depending upon the hydraulic pressure and flow in the at least two hydraulic actuators.

In yet another embodiment of the invention, the slide-out section is slidably supported above the stationary floor by a rail fixed to the slide-out section which engages rollers rotatably mounted to a bracket fixed to the stationary floor. The extendible ram can be connected to the rail, wherein movement of the ram slidably moves the rail relative to the stationary floor.

A general objective of the present invention is to minimize the space required to house the actuating mechanism when the slide-out section is fully extended. This objective is accomplished by retracting the hydraulic actuators when extending the slide-out section to minimize the length of the hydraulic actuators when the least amount of space is available for housing the actuating mechanism.

Another objective is to provide a vehicle having a slide-out section which extends without skewing. This objective is accomplished by providing an actuating mechanism having two or more hydraulic actuators which are extended and retracted at approximately the same speed using a flow divider to direct hydraulic fluid to the hydraulic actuator encountering more resistance than the other hydraulic actuators.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 7 is an end view of the bracket of FIG. 6;

FIG. 8 is a side view of the bracket of FIG. 6;

FIG. 9 is a top view of the bracket of FIG. 6;

FIG. 10 is an end view of the rail of FIG. 6;

FIG. 11 is an side view of the rail of FIG. 6;

FIG. 12 is a top view of the rail of FIG. 6;

DETAILED DESCRIPTION OF THE INVENTION

The present invention provides a slide out assembly attached to a known trailer or recreational vehicle which provides distinct advantages over the prior art as will be described and appreciated hereafter. In the preferred embodiment, the trailer or recreational vehicle (generally referred to as the vehicle) is equipped with a slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
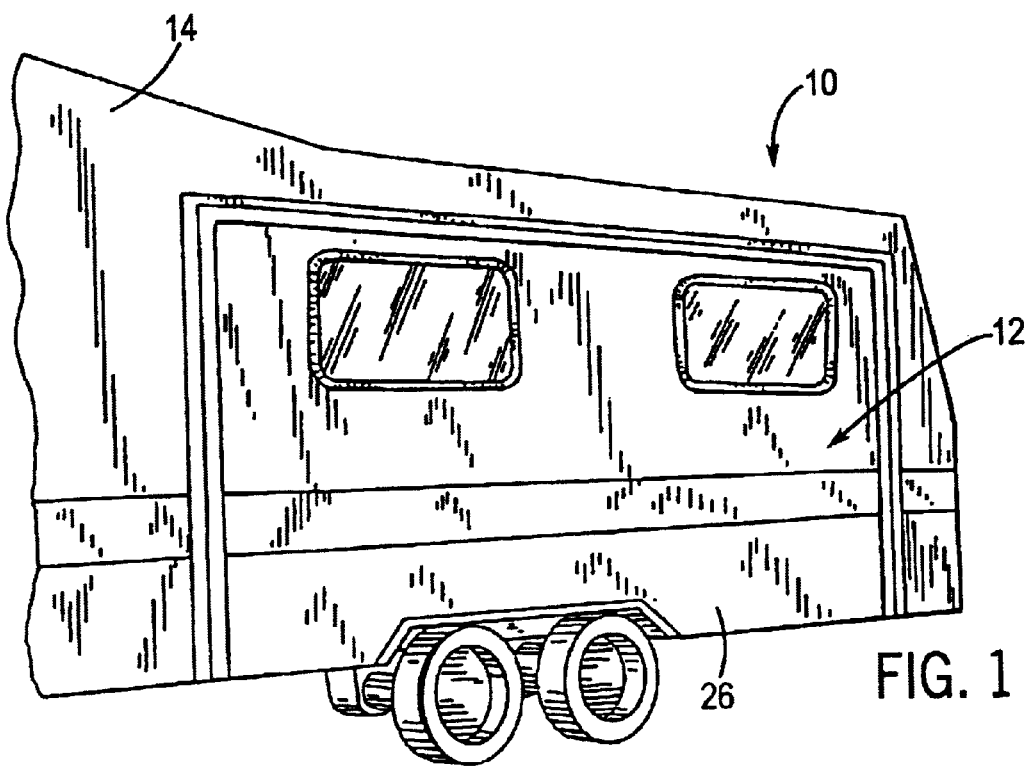
FIG. 1 is a side view of a vehicle having a slide-out section incorporating the present invention mounted thereon in a retracted position.
Figure 2:
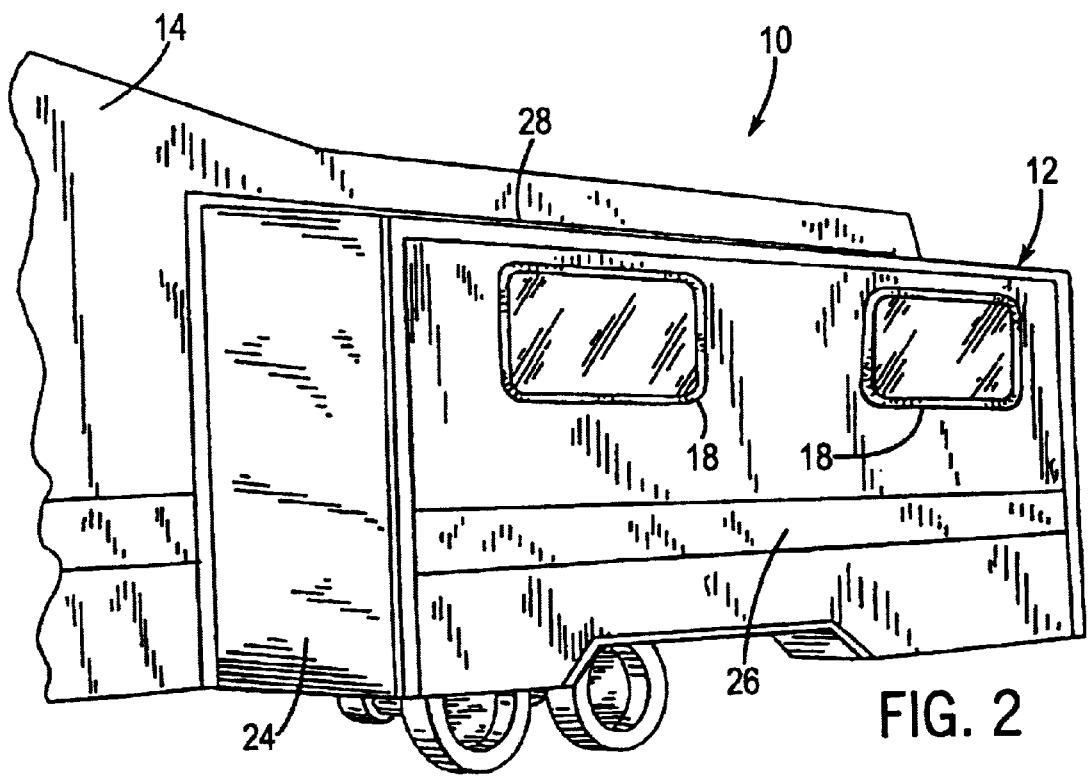
FIG. 2 is a side view of the vehicle of FIG. 1 in which the slide section is in an extended position.
Figure 3:
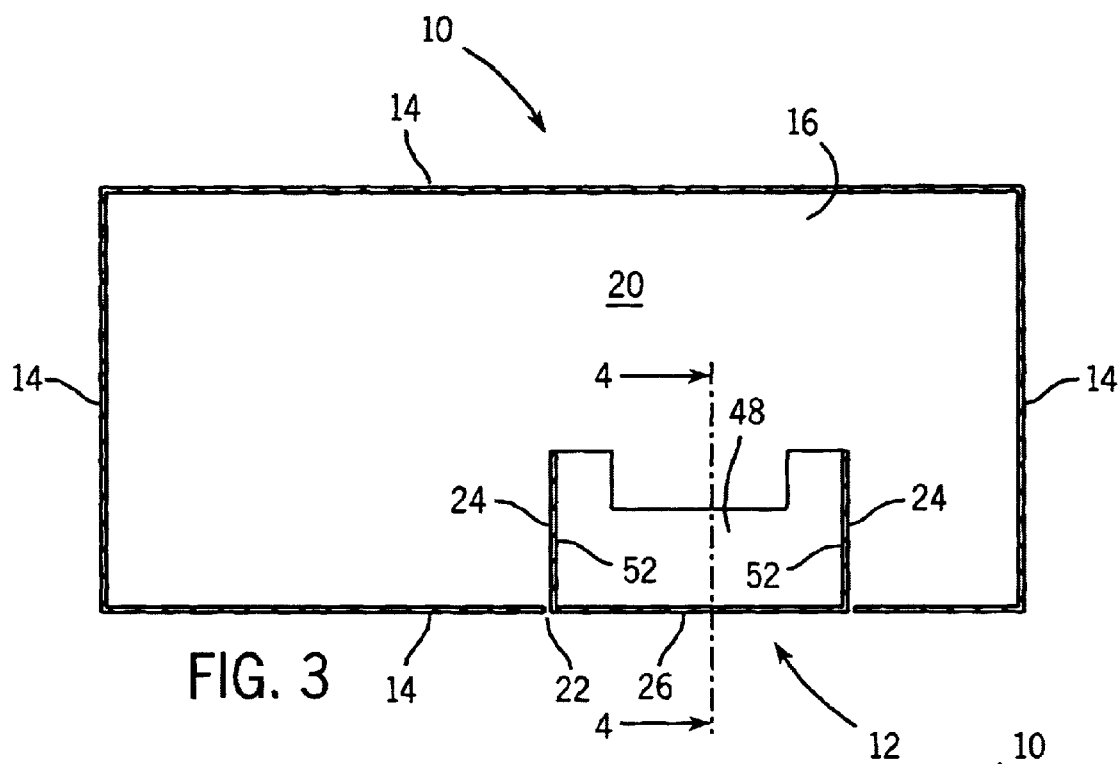
FIG. 3 is a top plan view of the vehicle of FIG. 1.

FIG. 1 illustrates the vehicle body 10 having mounted thereon an expandable, telescopic slide-out room section 12 incorporating the present invention in its fully retracted position. FIG. 2 is a similar view with the slide-out section 12 fully extended.

As shown in FIGS. 3–12, the vehicle 10 includes exterior walls 14 surrounding a stationary floor 16 covered by a vehicle roof 18 to define a vehicle interior 20. An opening 22 formed in one of the exterior walls 14 receives the slide-out section 12 supported above the stationary floor 16.

The slide-out section 12 includes a pair of sidewalls 24 extending from a movable exterior wall 26. When the slide-out section 12 is fully retracted, the exterior wall 26 is substantially flush with the vehicle exterior wall 14, and closes the vehicle exterior wall opening 22. The pair of slide-out section sidewalls 24 extend inwardly through the opening 22 towards the vehicle interior 20 from opposing side edges of the slide-out section exterior wall 26. A top plate 28 proximal a top edge of the slide-out section exterior wall 26 extends generally parallel to the vehicle stationary floor 16 through the opening 22 towards the vehicle interior 20. A fascia plate 30 proximal an interior edge of the top plate 28 extends upwardly from the top plate 28 toward the vehicle roof 18. Elastomeric seals, such as rubber seals, are fixed between the slide-out section when the slide-out section is fully extended and fully retracted. The seals protect the vehicle interior 20 from adverse weather conditions.

The slide-out section 12 is supported above the vehicle stationary floor 16 by a pair of U-shaped brackets 32. Each bracket 32 has a base 34 fixed to the vehicle stationary floor 16 using methods known in the art, such as bolting. A pair of legs 36 extend upwardly from the base 34 to form the U-shape. Rollers 38 are rotatably mounted to one of the legs 36, and have axes 40 which are substantially perpendicular to the slide-out section direction of travel The rollers 38 support an elongated rail 42 fixed to each slide-out section sidewall 24.

Each rail 42 has a C-profile which wraps around the rollers 38, and is fixed to one of the slide-out section sidewalls 24. The rail 42 slidably moves in a longitudinal direction as the slide-out section 12 moves between the retracted and extended positions. A hitch 44 having a ball 46 is fixed to the rail 42, and extends substantially parallel to the roller axes 40. Although a rail having a C-profile engaging rollers is disclosed, rails having other profiles such as a square, circular, U-shape, and the like, can be used without departing from the scope of the invention. Moreover, the rail can be supported by a low friction surface, such as UHMW, bearings, lubricated surface, and the like without departing from the scope of the invention.

Figure 5:
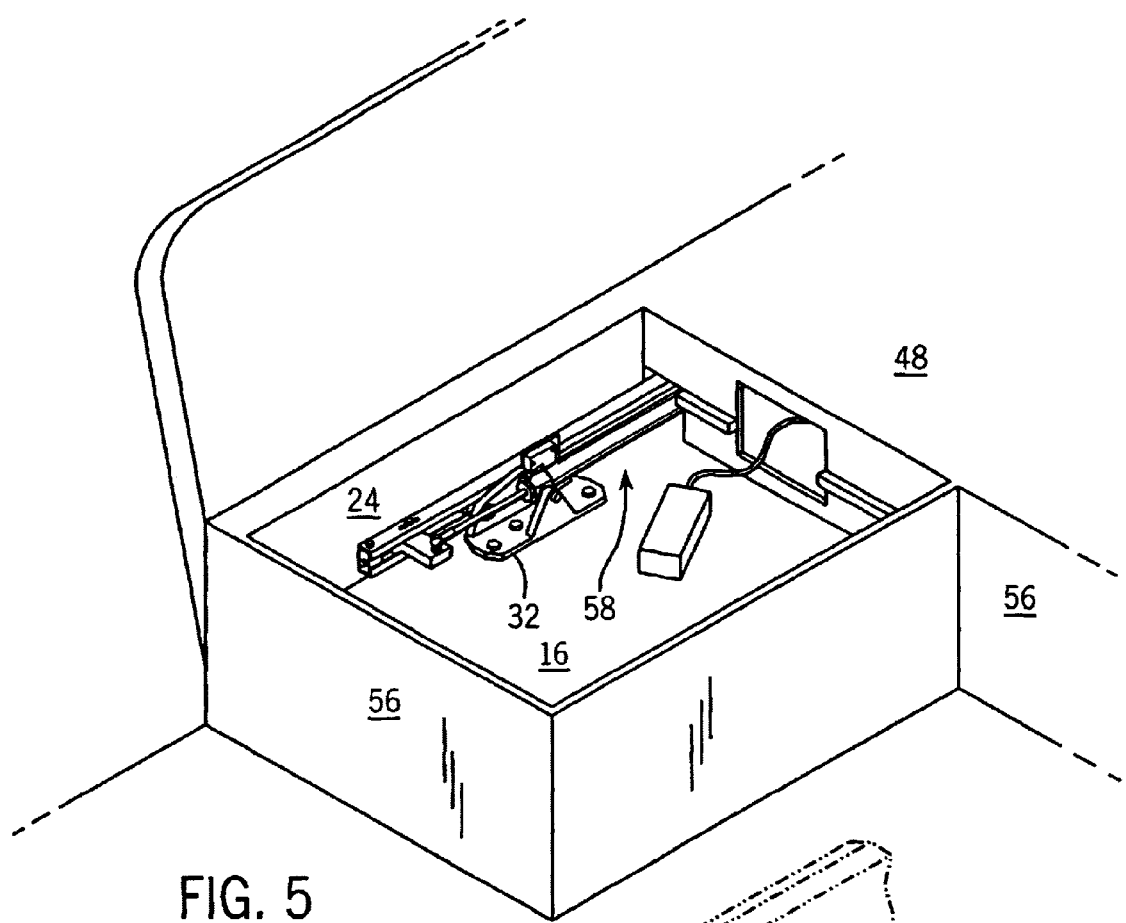
FIG. 5 is a view of the platform with a portion removed to reveal the actuator supporting one side of the slide-out section.
Figure 6:
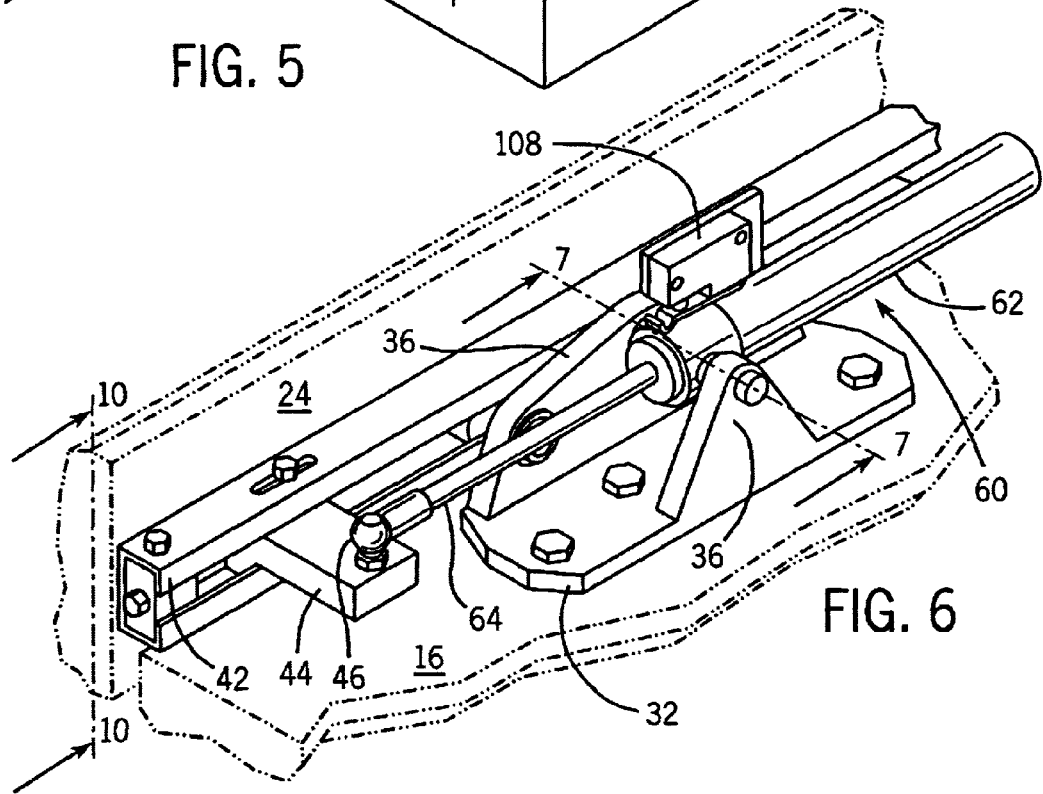
FIG. 6 is a view of the bracket supporting the rail connected to the actuator.

A platform 48, such as suitable for use as a bench, bed base, and the like, is fixed between the slide-out section sidewalls 24 above the vehicle stationary floor 16. The platform 48 is U-shaped having a rear edge 50 fixed to the slide-out section exterior wall 26, a pair of opposing side edges 52 fixed to the slide-out section sidewalls 24, and a front edge 54. A front plate 56 extends downwardly from the platform front edge 54 toward the vehicle stationary floor 16. Preferably, the platform 48 has removable portions (such as shown in FIG. 5) to provide access to a slide-out actuating assembly 58.

The slide-out actuating assembly 58 is housed beneath the platform 48, and includes a pair of double actuating hydraulic actuators 60 which urge the slide-out section 12 between the extended and retracted positions. Each actuator 60 has a cylinder 62 fixed to one of the brackets 32 and an extendible ram 64 fixed to the ball 46 of one of the rails 42. Extension of the ram 64 drives the slide-out section 12 from the extended position to the retracted position. Likewise, retraction of the ram 64 pulls the slide-out section 12 from the retracted position to the extended position. Advantageously, retracting the rams 64 to extend the slide-out section 12 minimizes the required space beneath the platform 48 for housing the slide-out actuating assembly 58 by minimizing the length of the hydraulic actuators 60 when the least amount of space underneath the platform 48 is available for housing the slide-out actuating assembly 58.

Referring now to FIGS. 13–17, the hydraulic actuators 60 are actuated by a hydraulic circuit 66 which drives the actuator rams 64 at approximately the same speed to avoid skewing. The hydraulic circuit 66 includes an extension circuit 68 which supplies hydraulic fluid to one end 70 of each hydraulic actuator 60 to extend the rams 64, and a retraction circuit 72 which supplies hydraulic fluid to the other end 74 of each hydraulic actuator 60 to retract the rams 64. A pump 76 supplies fluid to the desired circuit 68, 72 depending upon the operator selected pump direction. The pump 76 is electrically connected to an electronic control unit 78 which controls the pump operation, and thus the movement of the slide-out section 12.

The extension circuit 68 and retraction circuit 72 are substantially identical with the difference being which end 70, 74 of the hydraulic actuator 60 is supplied with hydraulic fluid. Accordingly, the following description is made with reference to the retraction circuit 72 with the understanding that the description also applies to the extension circuit 68.

The retraction circuit 72 includes a main supply line 80 having a pressure relief valve 84 and a pilot operated check valve 86. The pressure relief valve 84 is automatically opened to allow fluid to flow into a reservoir 87 when fluid pressure in the main supply line 80 exceeds a predetermined value.

The pilot operated check valve 86 operates to allow fluid to flow toward the actuators 60 and prevent the fluid from flowing in the reverse direction. A pilot line 88 connects the check valve 86 in the retraction circuit supply line 82 to an extension circuit supply line 80. A positive pressure in the extension circuit supply line 80 sensed by the pilot line 88 opens the check valve 86 to allow hydraulic fluid to flow in the reverse direction away from the actuators 60 past the check valve 84. For example, when the pilot line 88 connecting the retraction circuit check valve 86 and the extension circuit supply line 80 senses a positive pressure in the extension circuit supply line 80, the retraction circuit check valve 86 is opened to allow hydraulic fluid draining from the hydraulic actuator ends 74 to flow past the retraction circuit check valve 86 back toward to the pump 76. The fluid flowing back to the pump 76 is then pumped into the extension circuit supply line 82.

The retraction circuit supply line 82 supplies hydraulic fluid to a flow diverter 90 which splits the hydraulic fluid between left and right branch lines 92, 94. Each branch line 92, 94 feeds the end 74 of one hydraulic actuator 60. Drain lines 96 divert the flow of hydraulic fluid from each branch line 92, 94 around the flow diverter 90 to the supply line 82 when evacuating fluid from the end 74 of the hydraulic actuator 60.

The flow diverter 90 diverts hydraulic fluid through the branch lines 92, 94 to the hydraulic actuators 60 depending upon the hydraulic pressure in the actuators 60 using a pilot operator spool valve 98. A pilot line 100 in the left branch line 92 exerts a pressure against the spool valve 98 to urge the spool valve 98 toward the right against a pressure exerted by a second pilot line 102 in the right branch line 94 which urges the spool valve 98 to the left.

Moving the spool valve 98 to the right increases the flow of hydraulic fluid to the left branch line 92 while decreasing the flow of hydraulic fluid to the right branch line 94, and vice versa. As a result, when one branch line 92, 94 has a hydraulic fluid pressure which is greater than the other branch line 94, 92, more hydraulic fluid is diverted to the branch line 92, 94 having the greater pressure at the expense of the other branch line 94, 92. Advantageously, diverting hydraulic fluid to the branch line 92, 94 having a higher pressure using the flow divider 90 causes the actuator rams 60 to move at the substantially same speed automatically by directing hydraulic fluid to the hydraulic actuator 60 which is encountering more resistance than the other hydraulic actuator 60, thus avoiding skewing. In addition, the flow divider ensures the elastomeric seal is uniformly compressed to provide a tight seal around the vehicle opening 22.

Orifices 104 upstream of the spool valve 98 in each branch line 92, 94 prevent the flow of hydraulic fluid above a predetermined flow rate. Preferably, the predetermined flow rate is less than the flow rate capacity of the spool valve 98.

Figure 13:
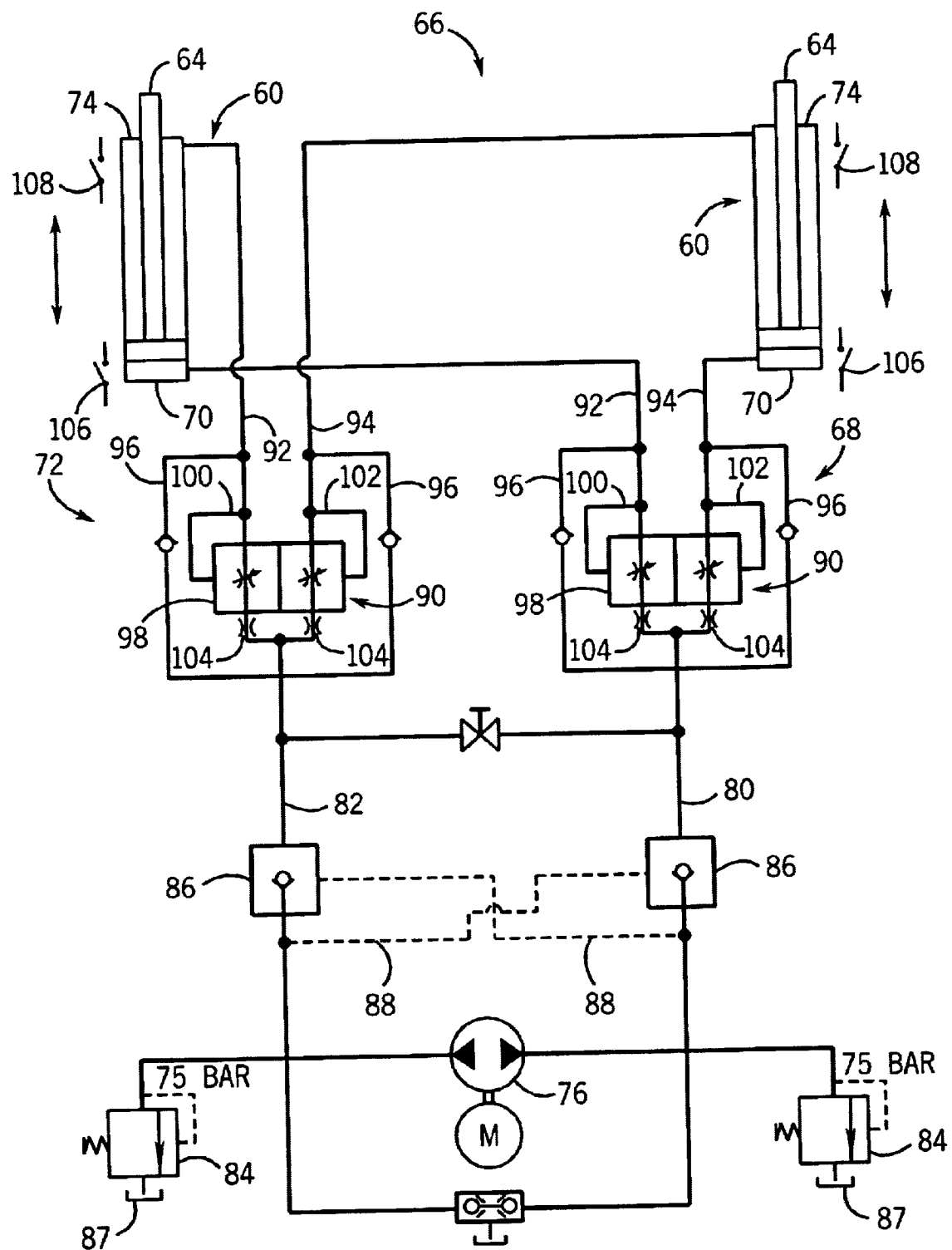
FIG. 13 is a hydraulic diagram of the slide-out actuating assembly.
Figure 14:
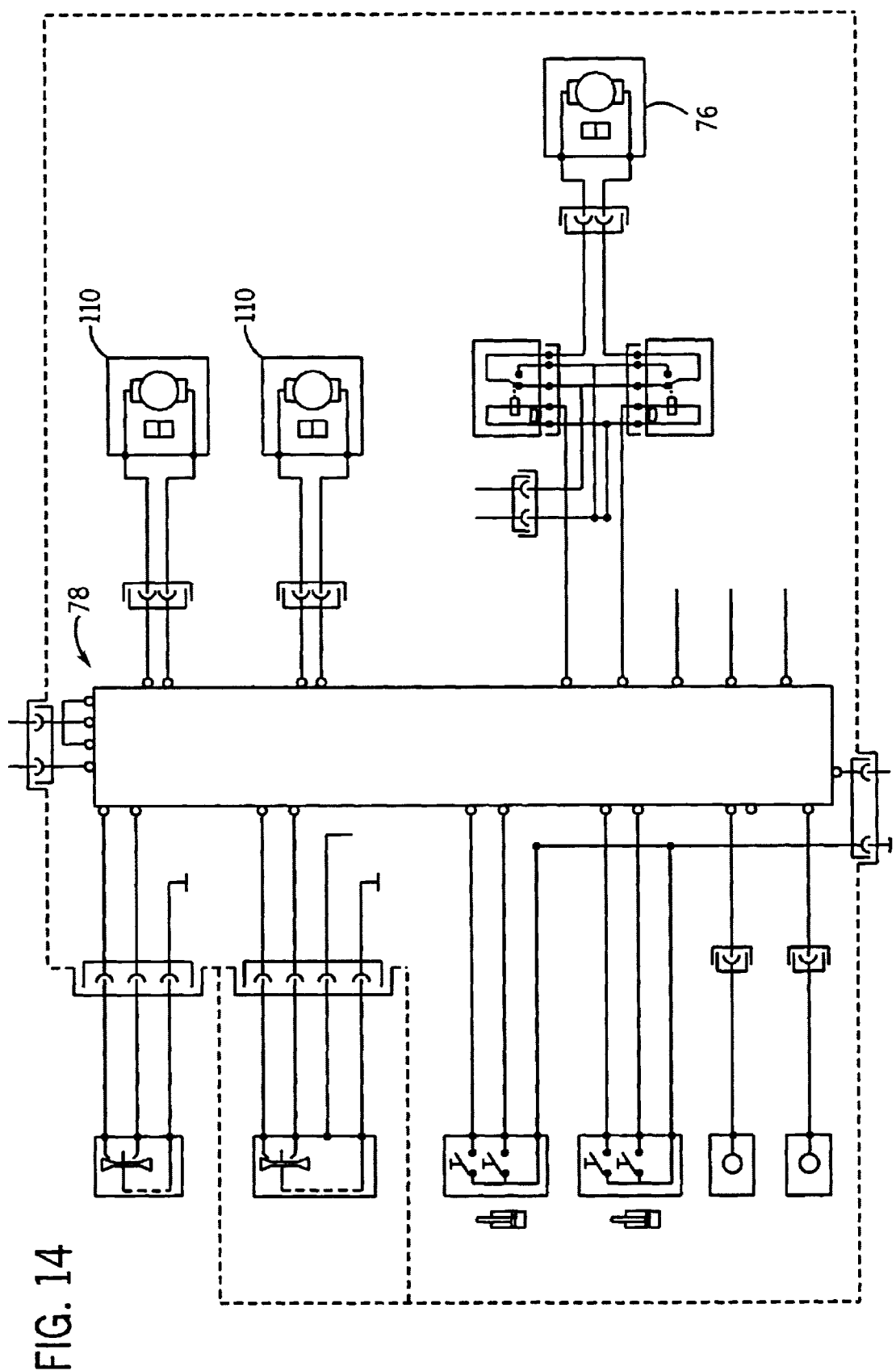
FIG. 14 is a schematic of the electronic control unit for use with the slide-out actuating assembly of FIG. 13.
Figure 15:
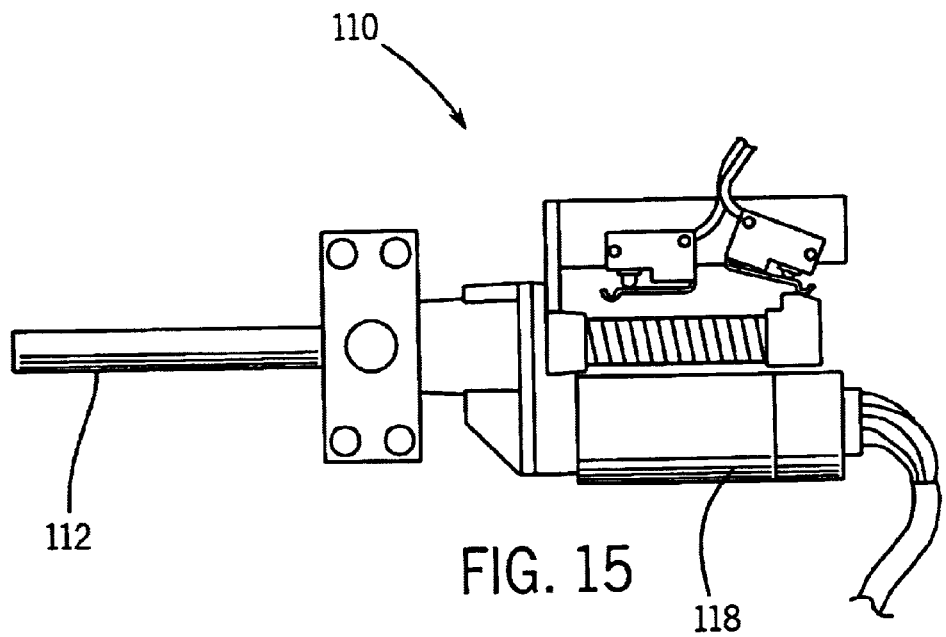
FIG. 15 is a perspective view of the latch fully retracted.
Figure 16:
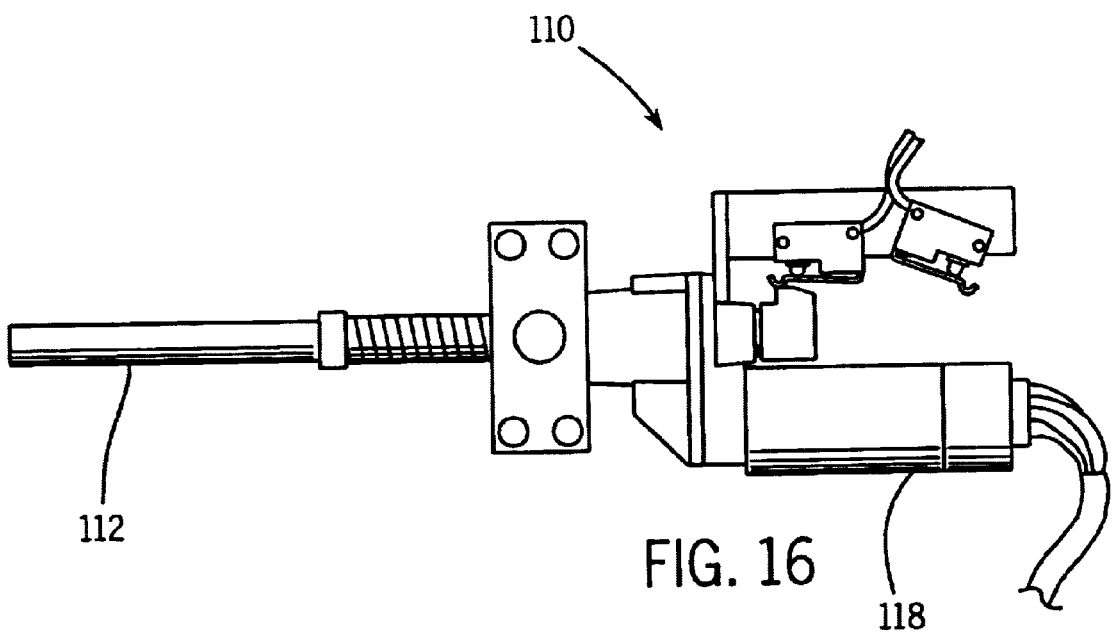
FIG. 16 is a perspective of the latch fully extended.

The electronic control unit 78 receives inputs from limit switches 106, 108 to determine whether the slide-out section 12 is in the extended or retracted position. Preferably, as shown in FIG. 13, a limit switch 106, 108 is positioned adjacent each end 70, 74 of each actuator 60 to determine whether all of the actuator rams 64 are fully extended or fully retracted.

Referring to FIGS. 4 and 14–16, the electronic control unit 78 also controls two latches 110 which lock the slide-out section 12 in either the extended or retracted positions. The latches 110 are fixed to the top plate 28 of the slide-out section 12, and have extendable pins 112 which can be extended perpendicular to the slide-out section sidewalls 24 into holes 114, 116 formed in the vehicle 10. Preferably, the latches 110 are actuated automatically by the electronic control unit 78 to lock the slide-out section 12 in the desired position, once the limit switches 106, 108 signal the electronic control unit that the slide-out section 12 is in the desired position.

A first set of holes 114 formed in the vehicle interior 20 receive the pins 112 when the slide-out section 12 is in the retracted position. A second set of holes 116 formed in the vehicle 10 between the first set of holes 114 and the vehicle exterior wall opening 22 receive the pins 112 when the slide-out section 12 is in the extended position.

Each latch 110 is electrically connected to the electronic control unit 78, and includes a reversible motor 118 which axially drives the pin 112 between a latch position and an unlatch position. Preferably, the motor 118 includes a Hall-effect sensor which senses each rotation of the motor spindle. Upon completion of a predetermined number of rotations indicating a known length of extension or retraction of the pin 112, the electronic control unit 78 cuts power to the motor 118 to stop axial movement of the pin 112.

Figure 17:
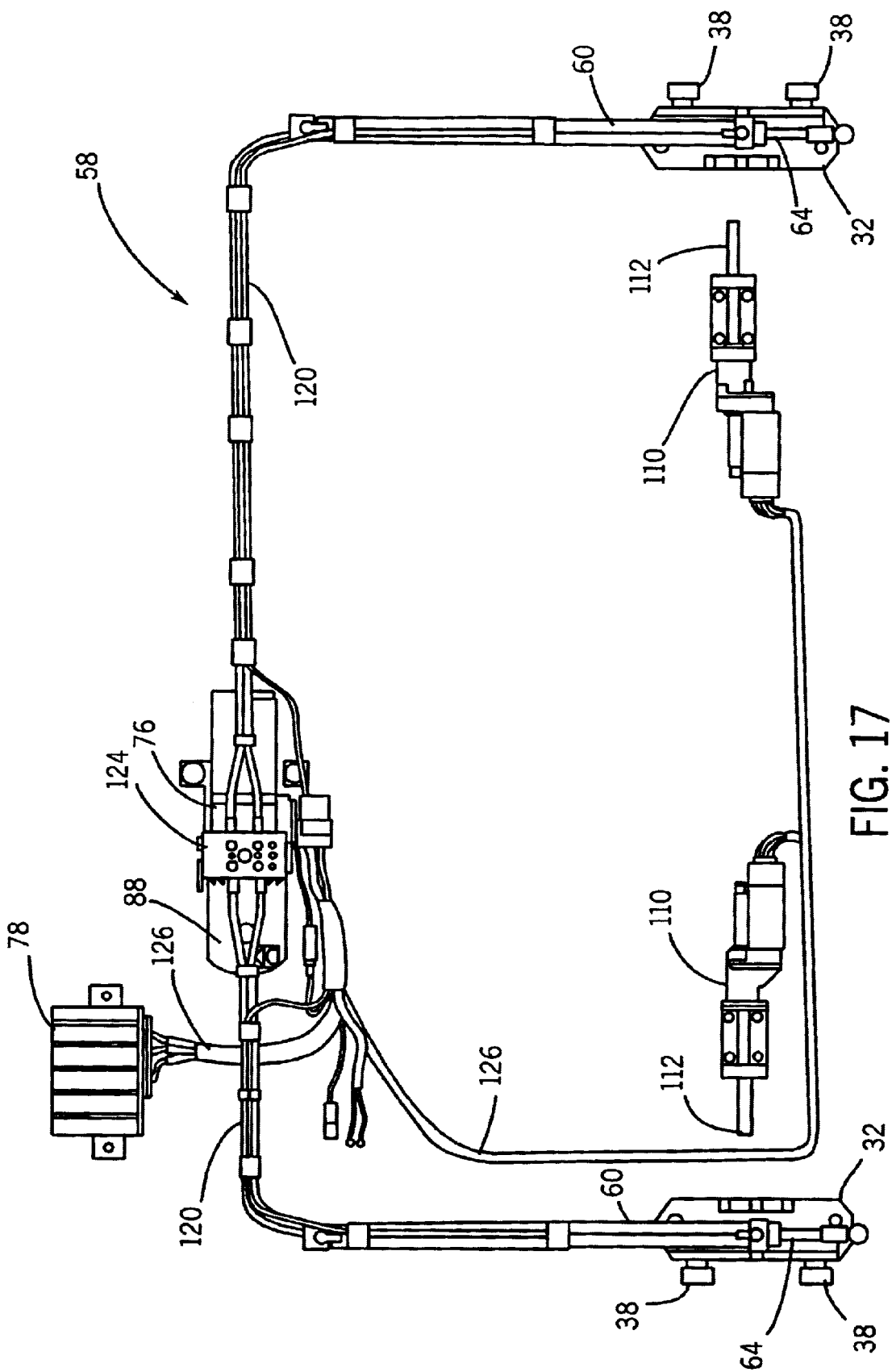
FIG. 17 is a perspective view of the slide-out actuating assembly incorporating the present invention.

Advantageously, as shown in FIGS. 13 and 17, the slide-out actuating assembly 58 can be a closed, self-contained system which is easily installed beneath the platform in the vehicle. The actuators 60 are connected by hoses 120 to a valve block 124 containing the hydraulic circuitry. The pump 76 and the reservoir 88 are attached to, and in fluid communication with the valve block 124. The electronic control unit 78 is electrically connected to the pump 76, limit switches 106, 108, and latches 110 using wires 126.

Figure 4:
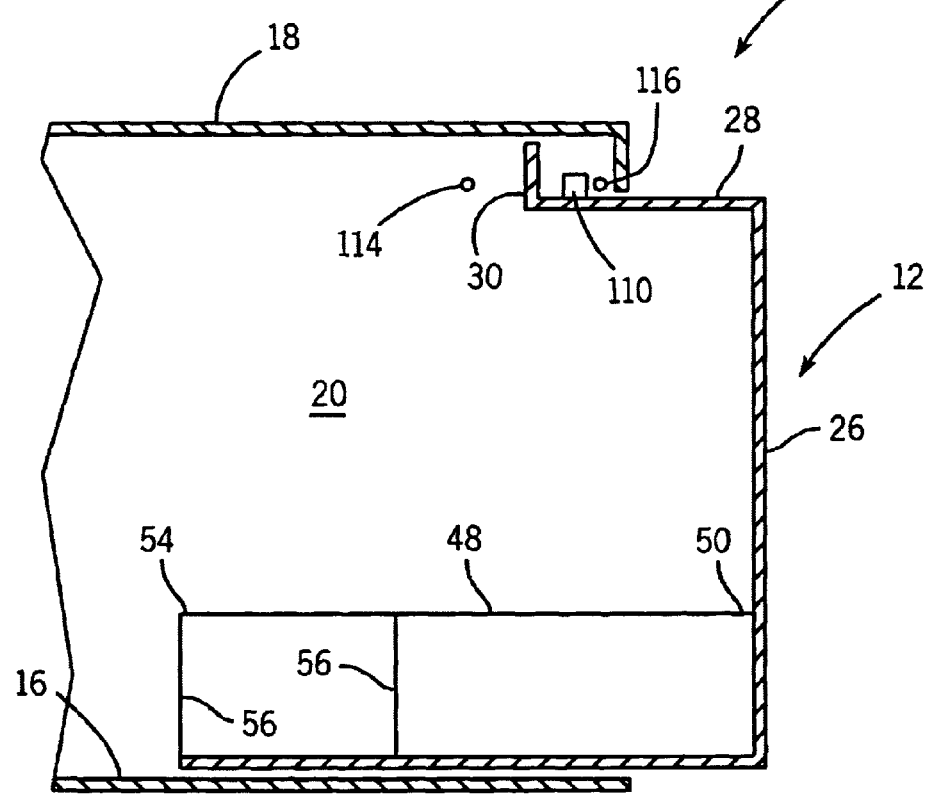
FIG. 4 is a cross sectional view of the slide-out section of FIG. 3 partially extended.

In use, referring to FIGS. 4 and 13, the slide-out section 12 is extended from the retracted position to the extended position by retracting the latch pins 112 from the first set of holes 114, and energizing the pump 76 to force fluid through the retraction circuit 68 to retract the actuator rams 64. As the rams 64 are retracted, the slide-out section 12 is pulled outwardly toward the extended position. When the limit switches 106 are tripped indicating that both rams 64 are fully retracted, the pump 76 is deenergized and the latch pins 112 are extended into the second set of holes 116 to lock the slide-out section 12 in the extended position.

The slide-out section 12 is retracted from the extended position to the retracted position by retracting the latch pins 112 from the second set of holes 116, and energizing the pump 76 to force fluid through the extension circuit 72 to extend the actuator rams 64. As the rams 64 are extended, the slide-out section 12 is pushed inwardly toward the retracted position. When the limit switches 108 are tripped indicating that both rams 64 are fully extended, the pump 76 is deenergized and the latch pins 112 are extended into the first set of holes 114 to lock the slide-out section 12 in the retracted position.

In another embodiment of the invention, the pump 76 and hydraulic circuitry 66 is modified by adding additional hydraulic valves to provide pressurized hydraulic fluid to other hydraulic actuators. For example, the pump can supply hydraulic fluid to hydraulic actuators which slidably move a second slide-out section, such as a kitchen section. In addition, the pump can supply hydraulic fluid to leveling feet which level the vehicle when parked.

In yet another embodiment, the electronic control system includes a radio frequency signal receiver which receives inputs from a radio frequency transmitter. The inputs can initiate and cancel the operation of the slide-out assembly.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A vehicle comprising:

a stationary floor;

an exterior wall fixed relative to said stationary floor and extending upwardly from said stationary floor;

an opening formed in said exterior wall;

a slide-out section disposed in said opening, said slide-out section being movable relative to said stationary floor between an extended position and a retracted position; and an actuating mechanism including at least one hydraulic actuator, said hydraulic actuator having an extendible ram extendible from a cylinder, said extendible ram being fixed to at least one of said stationary floor and said slide-out section, and said cylinder being fixed to the other of said stationary floor and said slide-out section, wherein retraction of said extendible ram slidably moves said slide-out section to the extended position.

2. The vehicle as in claim 1, in which said slide-out section includes a platform spaced above said stationary floor, and said actuating mechanism is housed beneath said platform.

3. The vehicle as in claim 1, in which an electronic control unit controls said actuating mechanism and at least one latch, wherein when said slide-out section is in at least one of the extended position and retracted position, said electronic control unit energizes said latch to lock said slide-out section in said at least one of the extended position and said retracted position.

4. The vehicle as in claim 3, in which said at least one latch is fixed to said slide-out section, and engages a hole formed in said vehicle, wherein said hole is fixed relative to said stationary floor.

5. The vehicle as in claim 3, in which said slide-out section includes a top plate proximal a top edge of said opening, and said at least one latch is fixed to said top plate.

6. The vehicle as in claim 1, in which said actuating mechanism include at least two hydraulic actuators and a hydraulic circuit supplying hydraulic fluid to said at least two hydraulic actuators.

7. The vehicle as in claim 6, in which said hydraulic circuit includes a flow divider which divides the flow of hydraulic fluid between said at least two hydraulic actuators depending upon the hydraulic pressure and fluid flow in said at least two hydraulic actuators.

8. The vehicle as in claim 1, in which said slide-out section is slidably supported above said stationary floor by a rail fixed to said slide-out section and engaging rollers rotatably mounted to a bracket fixed to said stationary floor.

9. The vehicle as in claim 8, in which said extendible ram is connected to said rail, wherein movement of said ram slidably moves said rail relative to said stationary floor.

10. A method of operating a slide-out assembly forming part of a vehicle, wherein the slide-out assembly includes an actuating mechanism including at least one hydraulic actuator, said hydraulic actuator having an extendible ram extendible from a cylinder, said extendible ram being fixed to at least one of a stationary floor and a slide-out section, and said cylinder being fixed to the other of said stationary floor and said slide-out section, said method comprising:

retracting said extendible ram into the cylinder to slidably move the slide-out section from a retracted position to an extended position.

11. The method as in claim 10, including latching said slide-out section in the extended position.

12. The method as in claim 10, in which the actuating mechanism includes at least one other hydraulic actuator, said other hydraulic actuator having an other extendible ram extendible from an other cylinder, said other extendible ram being fixed to at least one of a stationary floor and a slide-out section, and said other cylinder being fixed to the other of said stationary floor and said slide-out section, the method includes dividing the flow of hydraulic fluid between said hydraulic actuators depending upon the hydraulic pressure in said hydraulic actuators.

* * * * *